April 15, 1930.   F. G. HUGHES   1,754,892
BEARING MOUNTING
Filed May 18, 1922
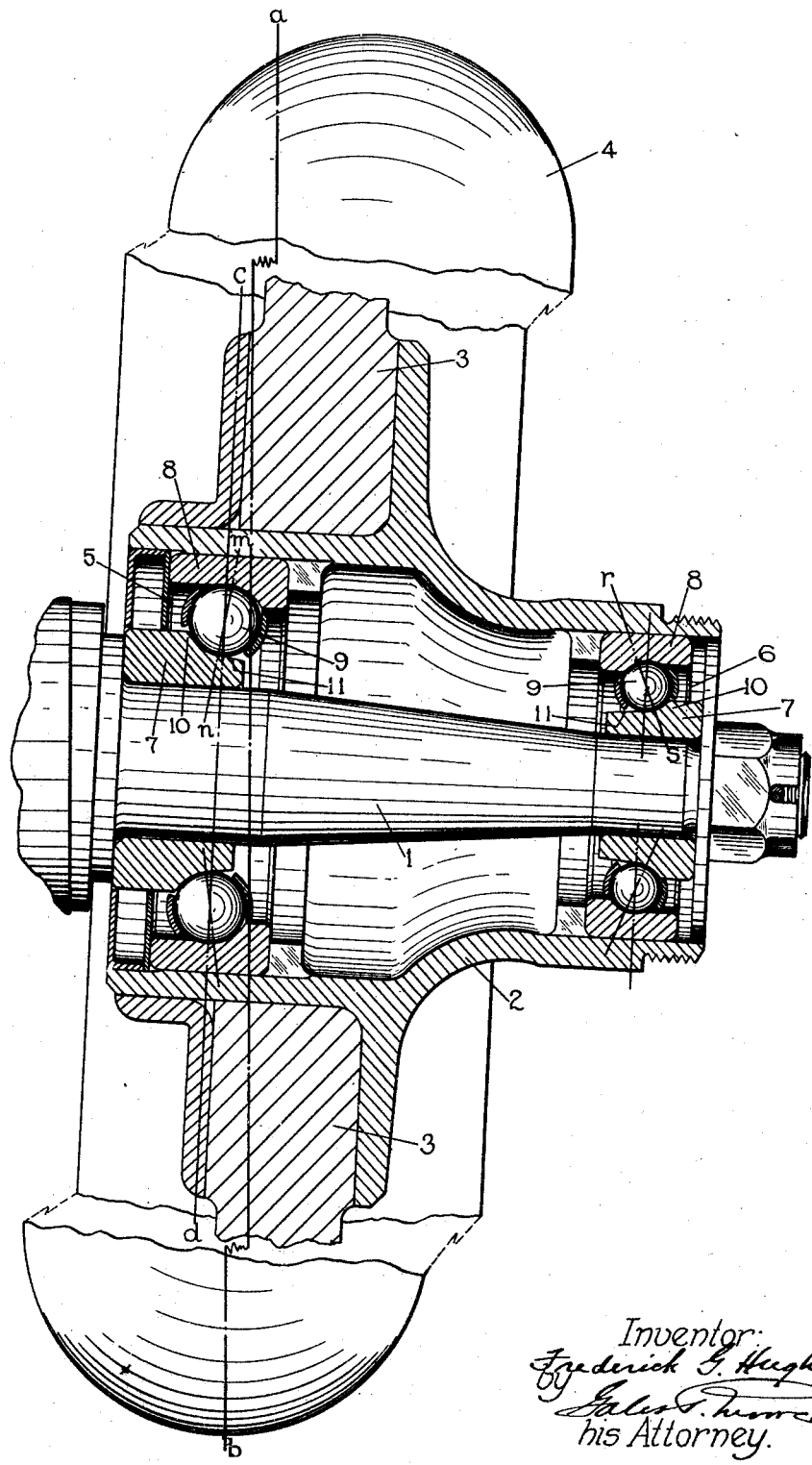
Inventor:
Frederick G. Hughes,
by
his Attorney.

Patented Apr. 15, 1930

1,754,892

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed May 18, 1922. Serial No. 561,933.

My invention relates to bearing-mountings, whether plain, roller, or otherwise, and, although in no wise limited to such application, is particularly adapted to ball bearings used as mountings for the front wheels (the steering wheels) of automobiles. My object is to provide a mounting which will present the usual advantageous features now found in such devices (such as ample supporting base, ease of assembly, ability to withstand thrusts, etc.) and yet will avoid undue strains and will properly proportion the strains to the respective bearings. More specifically, one of my objects is to provide a bearing-mounting which employs two opposed bearings of the "cup-and-cone" type and of different sizes and differently related to the direct load line of the wheel or other supported member, and yet has the ordinary lateral thrust strains of the two bearings balanced so that tendency of the wheel to work off of its axle spindle is avoided. To these ends, and also to improve generally upon devices of the character indicated, my invention consists in the various matters hereinafter described and claimed.

The figure of the accompanying drawing is an elevation, chiefly in section, showing an axle spindle with a wheel mounted thereon in accordance with my present invention.

In these drawings 1 indicates the customary axle spindle of one of the front wheels of an automobile, and 2 the usual hub or traveling support of such a wheel, 3 indicating the customary spokes, and 4 the tire. For reasons well understood in the art (for example, to enable the tire to be overhung by an ordinary fender of conveniently narrow width) it is customary and advantageous to place the spokes (and, consequently, the tread line of the tire) much nearer the inner end of the hub than the outer end, and for other sound and equally well understood reasons (such as to provide for ease in assembling, and also to enable the hub bearings to withstand lateral thrusts as well as the radial load of the car) it is customary to provide at each end of the hub a bearing 5, 6, of the "cup-and-cone" type, the inner bearing, 5, being larger than the outer bearing, 6, because the radial load, or "ground reaction," is more directly supported by the inner bearing than by the outer one, the load line, $a$—$b$, usually being quite near the vertical center line, $c$—$d$, of the inner bearing, 5, and sometimes substantially coincident with it.

Each cup-and-cone bearing comprises an inner ring, or cone, 7, mounted upon the spindle 1, and an outer ring, or cup, 8, secured to the hub 2, a race of balls, 9, being received between each pair of rings and running in opposed races formed in the surfaces of such rings. The cones have portions 10 which lie upon the outer side of the balls (that is, toward the ends of the hub) and these cones also have substantially straight surfaces 11 which extend inwardly from the bottoms of the balls, so that in assembling or disassembling the cones and balls can be readily slid into position relatively to each other when the balls are held in their races in the cups; also, the races in the cups and the cones are (as is well understood in the art) so curved with respect to the curvature of the balls that each ball bears upon its races at points which are in lines, $m$—$n$ and $r$—$s$, which are at angles to the vertical center lines of the bearings, whereby not only can each bearing sustain the radial (substantially vertical) load of the car but can also sustain lateral (substantially horizontal) thrusts, such as those induced when a car takes a curve, or skids.

The angle produced between such a center line as $c$—$d$ and the line, as $m$—$n$, in which lie the contact points between the bearing members (as between the balls and their cooperating race-rings 7 and 8) is termed the "angle of contact," and according to my invention such angle of contact of one of the bearings (here the larger, inner bearing 5) is less than the angle of contact of the cooperating bearing (here the outer bearing 6.) It is a fact that when a radial load is applied to any bearing whose load-supporting members have angular contact with each other, the natural tendency is for the cup and the cone of that bearing to slide laterally away from each other, as one wedge-shaped block would do when pressed against another with the inclined faces of the two wedges in contact; and it is a further fact that there is, under a given radial load, less such sliding tendency in a bearing with a small angle of contact than in a bearing with a larger angle under the same load. Therefore, the result of my herein-illustrated structure is that the natural lateral sliding tendency (or "induced thrust") of the inner bearing 5 is less than that of the co-operating outer bearing 6, so that, although the spokes (and, therefore, the load line, or "ground reaction" of the wheel) are nearer the bearing 5 than they are to the bearing 6 and, consequently, the bearing 5 is subjected to greater direct radial load than is the bearing 6, there is no undue tendency of the hub to push or thrust toward the bearing 6 at the outer end of the spindle; on the contrary, I so proportion the two angles of contact with respect to the radial loads to which the respective bearings are subjected that, when under their loads, the above-indicated lateral sliding tendencies, or "induced thrusts", of the two bearings are balanced, thereby obviating any tendency of the wheel to normally push itself off its spindle, and also obviating subjecting the outer, smaller bearing 6 to an undue constant thrust strain. Moreover, the relatively small angle of contact of the inner bearing 5 enables it to better support a given radial load than it could do were its angle of contact greater, and yet by providing some angle of contact the inner bearing is enabled to withstand the thrusts due to skidding, etc. The proper proportion between the angles of contact of any two cooperating bearings having a given size and intended to carry a given load can be readily ascertained by mathematical calculation, and for average use in passenger automobiles I have found it satisfactory to give the inner bearing 5 an angle of contact of thirteen degrees and to make such angle of the outer bearing 6 twenty degrees.

Thus my mounting advantageously proportions strains, and in its embodiment selected for illustration herein, it permits the spokes to be carried nearer one end of the hub than the other, permits the use of cup-and-cone bearings, permits the inner bearing to be relatively large and the outer bearing to be relatively small, and yet balances the induced thrusts of the two bearings, thereby obviating any tendency of the wheel to push itself off of its spindle, and relieving the small, outer bearing of unnecessary induced thrust from the larger, inner bearing.

It will, of course, be understood that my invention is in no wise limited to that embodiment of it herein particularly described. For example, my mounting could support the spindle of a lathe and the difference of angles of contact could be so proportioned as to enable a selected one of the bearings to withstand not merely the induced thrust from the other bearing but also the whole or any desired portion of some extraneous thrust, as that arising from some tool driven laterally along the work supported upon the lathe spindle.

I claim:

1. In a device of the character described, a spindle, opposed angular contact bearings of different sizes arranged near the ends of the spindle, a wheel hub rotatably supported by said bearings and having its rim-support nearer to the larger bearing, the relative angles of contact of the two bearings being substantially inversely proportional to the radial load on the bearings to equalize the induced end thrusts; substantially as described.

2. In a device of the character indicated, a hub, bearings therefor spaced from each other, the load upon said hub being nearer to one of said bearings than to the other, and the contact-angle between the load-supporting elements of the bearing farther from said load being greater, by the amount necessary to substantially equalize the lateral thrusts, than such angle between such parts of the other bearing; substantially as described.

3. In a device of the character indicated, a hub, bearings therefor spaced from each other and of different sizes, and the contact-angle between the load-supporting elements of the smaller bearing being greater, by the amount necessary to substantially equalize the lateral thrusts, than such angle between such parts of the larger bearing; substantially as described.

4. A device of the character indicated comprising a hub, bearings therefor spaced from each other and of different sizes, the load upon said hub being between said bearings and nearer one of these than the other, and the angle of contact between the load-supporting elements of the bearing farther from said load being greater, by the amount necessary to substantially equalize the lateral thrusts, than such angle between such parts of the other bearing; substantially as described.

In testimony whereof I hereunto affix my signature.

FREDERICK G. HUGHES.